United States Patent

[11] 3,610,554

| [72] | Inventors | Alex Schwarz<br>Englewood Cliffs;<br>Zoltan Gagyi, Bloomfield, both of N.J. |
|---|---|---|
| [21] | Appl. No. | 861,686 |
| [22] | Filed | Sept. 29, 1969 |
| [45] | Patented | Oct. 5, 1971 |
| [73] | Assignee | The Mosler Safe Company<br>New York, N.Y. |

[54] TRANSFER STATION FOR PNEUMATIC TUBE CONVEYOR SYSTEM
9 Claims, 9 Drawing Figs.

[52] U.S. Cl. .................................................. 243/19, 243/24, 243/38
[51] Int. Cl. .................................................. B65g 51/32
[50] Field of Search .................................. 243/16, 20, 24, 38, 19

[56] References Cited
UNITED STATES PATENTS

| 694,324 | 2/1902 | Pearsall ........................ | 243/24 |
| 943,329 | 12/1909 | Wolever ........................ | 243/38 |
| 3,053,475 | 9/1962 | Tonne ........................... | 243/16 |

FOREIGN PATENTS

| 409,786 | 10/1966 | Switzerland. ................. | 243/24 |

Primary Examiner—Harvey C. Hornsby
Assistant Examiner—Merle F. Maffei
Attorney—Wood, Herron & Evans ABSTRACT: A transfer station for pneumatic tube conveying system including a tray mechanism for facilitating transfer of carriers to and from the pneumatic tube, the tray mechanism including upper and lower semicylindrical trays movable between a closed position coaxial with the pneumatic tube in which the trays cooperate to form an extension of the pneumatic tube, and in open position radially displaced from the pneumatic tube in which the lower tray functions as a conveniently located carrier holding device for facilitating removal of a received carrier or insertion of a carrier for transmission.

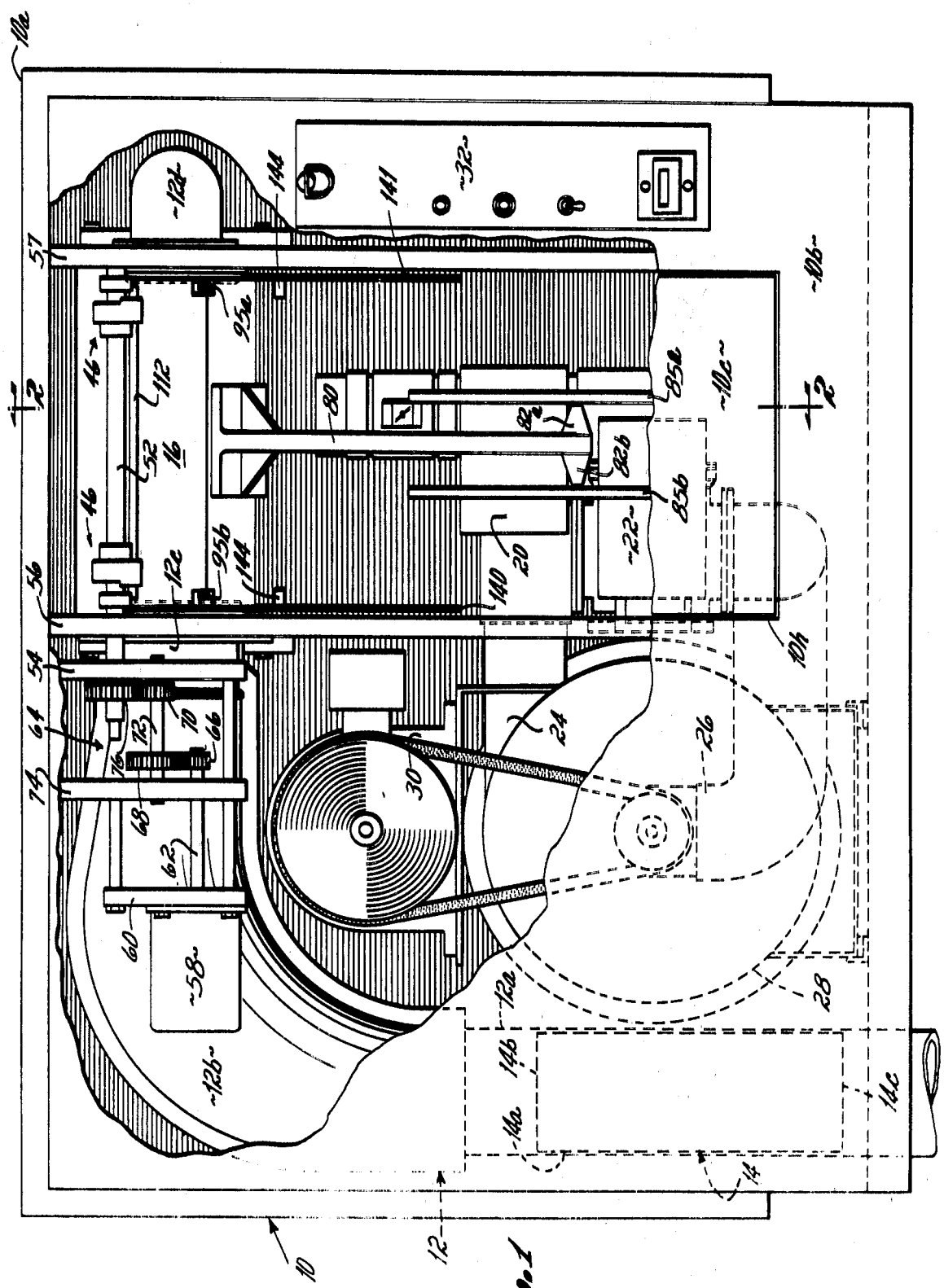

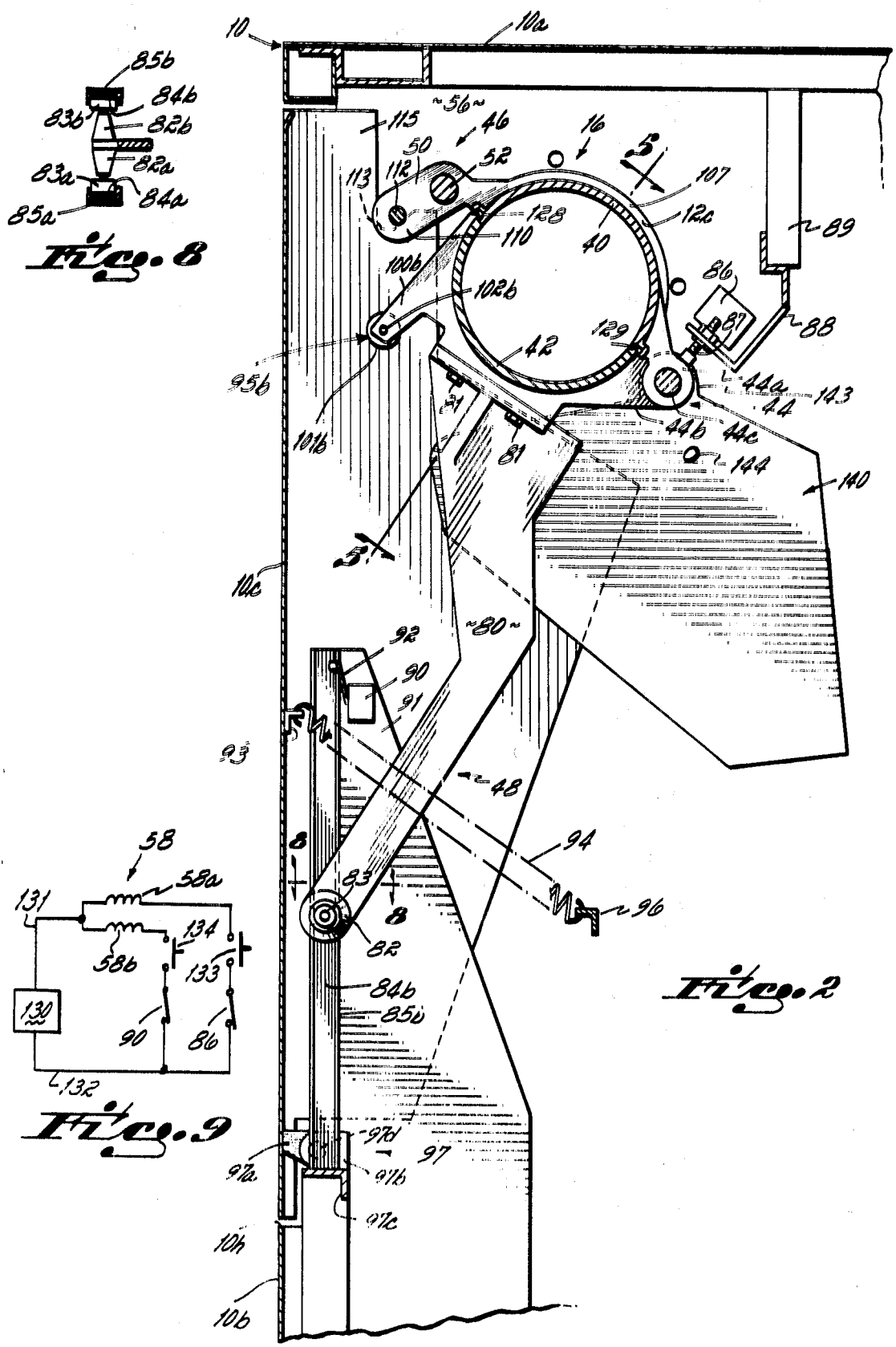

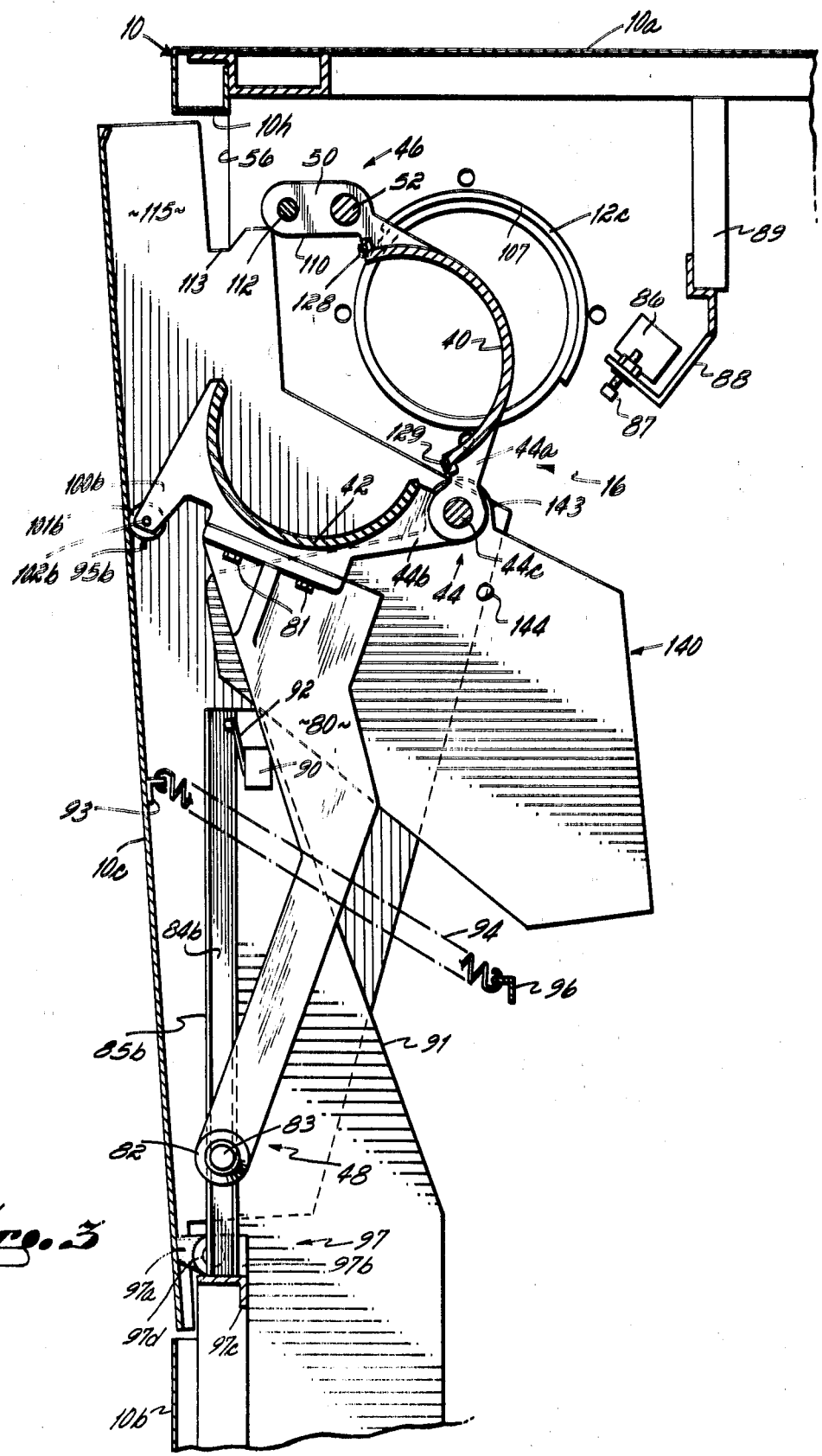

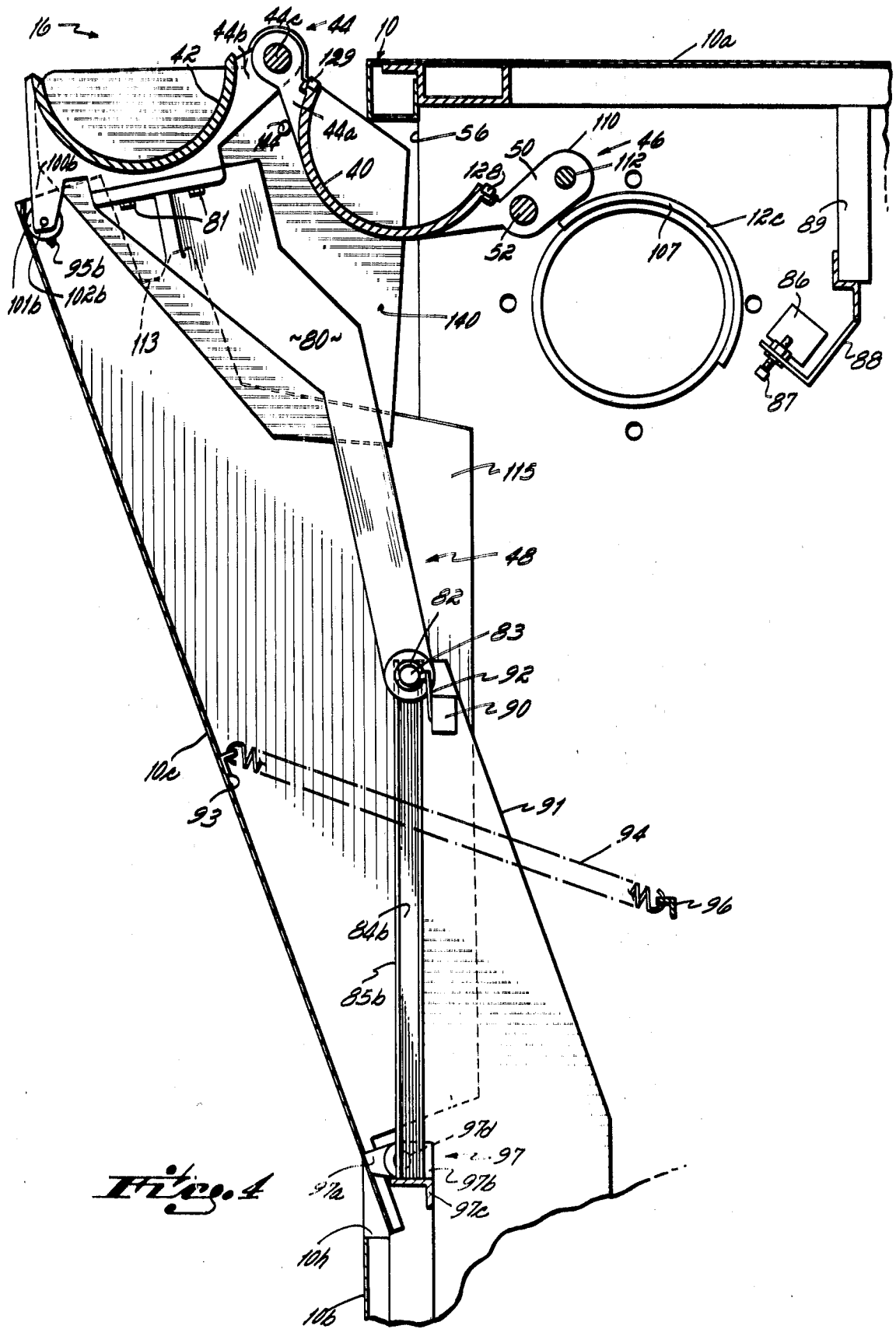

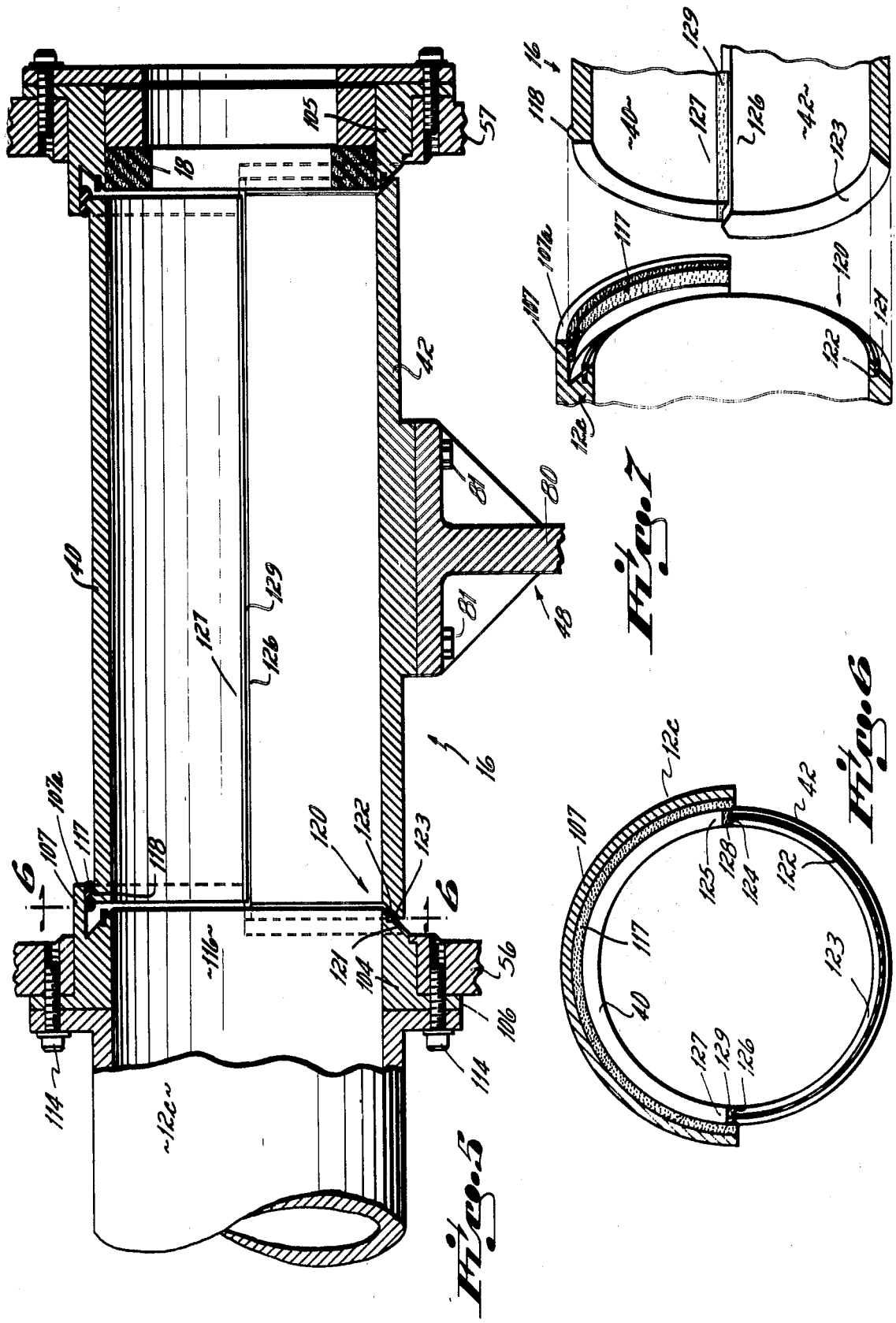

TRANSFER STATION FOR PNEUMATIC TUBE CONVEYOR SYSTEM

This invention relates to pneumatic tube conveying systems and more particularly to a transfer station for pneumatic tube conveying systems.

Pneumatic conveying systems typically include at least one pneumatic tube line interconnecting a minimum of two of geographically dispersed transfer stations. Small articles such as messages, securities, money or the like are transported between the transfer stations in cylindrical carriers which are propelled through the tubes by pneumatic pressure. In such installations the sender inserts the carrier into the pneumatic line at one transfer station termed the transmitting station, whereupon it is automatically directed to a distant station, termed the receiving station, by means of various conventional control devices. Upon arrival at the receiving station, the carrier is propelled through a suitable opening in the end of the tube against a stop or into a basket or like container located adjacent the end of the pneumatic tube. Once against the stop or in the basket, the carrier is available for manual removal. Alternatively, an access store may be provided in the wall of the pneumatic tube at the receiving station which can be opened to provide access to the interior of the tube for manual removal of carriers from the tube.

In certain applications wherein ease and convenience of use are extremely important considerations, the prior art carrier retrieval arrangements, such as the basket and access door types noted above, have been found not to be entirely satisfactory. One such application where ease of use and convenience are extremely important factors is in the field of remote terminal automobile drive-in banking. In a typical drive-in banking arrangement the customer drives up to the banking terminal, which is remote from the bank building proper, in his automobile for the purpose of making a banking transaction such as cashing a check, depositing to his account or the like, and in the course of effecting such transaction never leaves his automobile. Rather, the bank customer remains in the driver's seat behind the steering wheel and merely reaches out through the adjacent open window, inserting and/or removing his deposit, change, or other appropriate item from the banking terminal. The terminal in turn is interconnected with a teller's station in the distant bank building by a pneumatic tube system. Thus, the principal component of the remote banking installation which may also include a two-way communication system and/or a closed circuit television system to permit customer and teller to communicate are a pneumatic tube conveyor system which interconnects a transfer terminal inside the bank building where the remotely located clerk receives the deposit, withdrawal slip, check or the like from the customer and transmits to the customer his receipt, money, etc. and a transfer station at the drive-in bank terminal remote from the bank building proper in which the bank customer inserts his deposit, withdrawal or the like for transfer to the teller and thereafter receives from the teller a receipt, money or other appropriate item.

Since the contemplated mode of use of remote drive-in banking terminals, as indicated above, does not comprehend the customer leaving his car, but rather only reaching out of an open car window to effect the banking transaction, it is essential, if such installations are to be commercially successful, that the customer transfer terminal be designed for ease and convenience of use. Among other things, this requires that the customer terminal be designed such that carriers can be easily and conveniently removed therefrom as well as inserted therein for interstation transmission. If the customer terminal is not so designed, and for example requires undue customer reaching or carrier manipulation, the resultant customer inconvenience will deter customer usage and impede widespread commercial acceptance of the remote banking system of which it forms a part.

The carrier removal/insertion proposals heretofore suggested do not afford the desired degree of customer ease of use and convenience. For example, in those systems where a basket or similar device is located proximately the selectively openable end of a pneumatic tube, insertion of a carrier into the system for transmittal to the bank teller requires that the bank customer use two hands, one hand to hold the tube end cover in the open position and the other hand to insert the carrier into the tube. In the prior art proposals wherein an access door is provided in the wall of the tube the problem of undue customer hand manipulation is similarly present.

Accordingly, it is an objective of this invention to provide a transfer station for a pneumatic tube conveying system which permits users to easily and conveniently insert and/or withdraw carriers from the pneumatic tube. This objective has been accomplished in accordance with certain principles of this invention by providing in cooperation with the pneumatic tube, a pair of upper and lower semicylindrical tubular sections or trays which are movable between a closed and open position. In the closed position the tubular sections or trays cooperate to define a coaxial extension of the pneumatic tube capable of containing a carrier upon receipt from a remote station for subsequent retrieval by the user, or upon insertion by a user for transmission through the tube to the remote station. In the open position the lower semicylindrical section is displaced transversely relative to the pneumatic tube and functions as a conveniently located tray with respect to which carrier can either be withdrawn for use or inserted for subsequent transmission when the semicylindrical sections are positioned in their closed position in cooperative relation as a tubular coaxial extension of the pneumatic conveying tube.

In a preferred form of this invention the upper and lower semicylindrical tray sections are hinged together along one longitudinal edge with the other longitudinal edge of the upper tray mounted for rotation with a driven shaft disposed parallel to the tray edge. When the driven shaft is rotated in one direction the upper and lower tray halves come together, defining the closed position in which they cooperate to constitute a coaxial extension of the pneumatic tube. When the driven shaft is rotated in the opposite direction the trays separate, causing the lower tray to move transversely of the pneumatic tube axis to conveniently present or receive a carrier relative to the user.

It has been a further objective of this invention to provide protective means for securing the delivery tray mechanism against unauthorized use. This objective has been accomplished in accordance with certain additional principles of this invention by enclosing the delivery tray mechanism within a cabinet having a hinged door which is normally spring biased to a closed position wherein it is locked by engagement of a locking notch on the inside of the door and a lug associated with the upper tray which is also pivoted by the driven shaft, but which is easily and simply cammed open by the unhinged edge of the lower tray when the upper tray rotates to position the tray in the open position and the locking lug disengages the associated locking notch on the door.

It has been a further objective of this invention to provide simple but yet effective means for sealing the pneumatic tube and the semicylindrical members when positioned in their closed position wherein they constitute a coaxial extension of the pneumatic tube. This objective has been accomplished in accordance with certain further principles of this invention by providing the end of the pneumatic tube adjacent the semicylindrical trays with upper and lower semicylindrical sealing sections which cooperate with the upper and lower semicylindrical trays. The upper sealing section is in the form of a flange extending axially of the end of the pneumatic tube in overlying relationship to the adjacent edge of the upper semicylindrical tray such that when the upper semicylindrical tray is in its closed position it underlies and seals against the upper axially extending sealing section. The lower semicylindrical sealing section is in the form of a frustoconical surface formed on the end of the pneumatic tube which is adapted to underlie the adjacent end of the lower tray when in its closed position and which is located inwardly of the upper semicylindrical sealing flange section such as not to interfere with the motion of the upper tray as it moves between the opened and closed position.

In a preferred embodiment planar fins perpendicularly disposed and pivotally mounted on the hinge which interconnects the upper and lower trays are also provided. The fins abut the ends of the lower tray when the upper and lower trays are in their open position preventing a carrier located in the lower tray from sliding out of the tray. With the trays in the open position the fins also serve as guide means to enable a customer to properly return a carrier to the lower tray, i.e., to return a carrier to the lower tray in a manner such that the ends of the carrier do not protrude beyond the ends of the tray and thereby mechanically interfere with the pneumatic tube upon tray closure, preventing proper return of the tray. The fins swing to a position in nonabutting relationship with the ends when the trays move to their closed position, thereby moving clear of the trays and not inhibiting the sealing action between the tray ends and the pneumatic tube.

These and other advantages and objectives of this invention will become more readily apparent from a detailed description of a preferred embodiment thereof taken in conjunction with the following drawings in which:

FIG. 1 is a front elevational view partially cutaway, of a preferred embodiment of a transfer station incorporating the principles of this invention showing the relationship of the various components of the transfer station housed within the cabinet.

FIG. 2 is a cross-sectional view taken along lines 2—2 of FIG. 1 showing the delivery tray in the closed position.

FIG. 3 is a view similar to FIG. 2 showing the delivery tray in an intermediate position between the closed and open positions.

FIG. 4 is a view similar to FIGS. 2 and 3 showing the delivery tray in the fully open position.

FIG. 5 is a cross-sectional view taken along lines 5—5 of FIG. 2.

FIG. 6 is a cross-sectional view taken along lines 6—6 of FIG. 5.

FIG. 7 is a fragmentary perspective view, partially exploded and in cross section showing the manner in which the upper and lower sealing sections of the tube cooperate with the adjacent ends of the upper and lower trays.

FIG. 8 is a cross-sectional view taken along lines 8—8 of FIG. 2.

FIG. 9 is a schematic circuit diagram of one possible circuit embodiment for controlling the motor which effects opening and closing of the tray.

A preferred embodiment of the pneumatic tube transfer station incorporating certain of the principles of this invention generally includes, as best seen in FIG. 1, a housing or cabinet 10 fabricated of any suitable material such as sheet metal for enclosing the various operating components of the transfer station. Communicating with the interior of the housing 10 is a conventional pneumatic tube 12 in which a carrier 14 of conventional configuration is conveyed pneumatically in accordance with well-known principles. Since the structure of the carrier 14 is well known and forms no part of this invention the carrier structure is not described in detail. A suitable carrier structure is disclosed in detail in Voitas U.S. Pat. No. 3,323,755 for CARRIER FOR PNEUMATIC TUBE SYSTEM issued June 6, 1967 and includes a tubular body 14a having a circular cross section and identical closures 14b and 14c at opposite ends thereof to facilitate access to the interior of the carrier for insertion and withdrawal of items to be conveyed. The outside diameter of the carrier 14 is dimensioned to provide a sliding fit between the cylindrical exterior surface of the carrier and the interior walls of the pneumatic tube 12.

The pneumatic tube 12 includes a straight tubular section 12a, a 90° elbow 12b, and a terminal region 12c through which a carrier is adapted to pass in the course of being conveyed by the pneumatic tube 12 to a novel delivery tray 16 to be described in more detail hereafter. Associated with the delivery tray 16 and located at an end thereof opposite the terminal region 12c is a control tube 12d. The control tube 12d, which is provided with a carrier stop member 18 (FIG. 7) to prevent entry therein of a carrier conveyed to the delivery tray 16, is alternatively connected via valves 20 and 22 to the outlet and inlet ports 24 and 26 of an air pump 28 driven by a motor 30. Motor 30 alternatively applies superatmospheric and subatmospheric pressures to the control tube 12d to alternatively convey carriers to and from the delivery tray 16 via the pneumatic tube sections 12a, 12b, and 12c. Valves 20 and 22 are under the control of a suitable console control panel 32 which, in response to suitable switch actuation, effects the interchange of connections between the control tube 12d and the outlet and inlet ports 24 and 26 of the pump 28 as is necessary to alternatively convey carriers from and to the delivery tray 16 via the pneumatic tube section 12a, 12b, and 12c.

The delivery tray 16 includes a first semicylindrical member or tray 40 and a second semicylindrical member or tray 42. The semicylindrical members 40 and 42 are disposed between the spaced-apart terminal region 12c and the control tube 12d with their respective longitudinal axes disposed parallel to the axis of the terminal region 12c. The upper and lower semicylindrical members 40 and 42 are connected for movement relative to each other by a hinge 44. Hinge 44 includes ears 44a and 44b formed integral with the exterior of the upper and lower semicylindrical trays 40 and 42, and a pin 44c passing perpendicularly through suitably provided bores in the ears. The hinge 44 permits the upper and lower trays 40 and 42 to move between a closed position shown in FIG. 2 and an open position shown in FIG. 4. In the closed position of FIG. 2 the upper and lower trays cooperate to form a tubular extension of terminal region 12c which is adapted to contain therein a carrier. In the open position shown in FIG. 4 the lower tray 42 is displaced transversely of the axis of the terminal region 12c to facilitate convenient transfer of a carrier to or from the tray by the user.

With the upper and lower semicylindrical tray members 40 and 42 in the closed position shown in FIG. 2, the tubular enclosure formed thereby is coaxial with the terminal region 12c, permitting a carrier to be conveyed between the tray members 40 and 42 and the pneumatic tube sections 12a, 12b, and 12c. The dimensions of the upper and lower tray members 40 and 42 are selected such that when in the closed position shown in FIG. 2 the internal diameter of the combination thereof is substantially equal to the internal diameters of the straight pneumatic tube sections 12a and terminal region 12c, facilitating sliding engagement of a carrier 14 which may be positioned in the closed tray 16.

To facilitate movement of the upper and lower tray sections 40 and 42 between the closed position shown in FIG. 2 and the open position shown in FIG. 4, a pivotal drive mechanism 46 and guide assembly 48 is provided. The pivotal drive mechanism 46 includes an ear 50 extending radially from the exterior of the upper tray member 40 and a horizontal shaft 52 fixed to the ear 50. The shaft 52 is mounted for rotation about its longitudinal axis by suitable journal bearings formed in stationary vertical wall supports 54, 56, and 57. A motor 58 mounted to a stationary vertical support wall 60 and having an output shaft 62 drives the shaft 52 via a gear reduction assembly 64. The gear reduction assembly 64 includes a gear 66 secured to the end of the motor shaft 62, and gears 68 and 70 mounted for rotation with a shaft 72 journaled in stationary vertical wall members 74 and 54. Secured to the end of the shaft 52 and meshing with the gear 70 is a gear 76.

In operation, rotation of the shaft 52 in a clockwise direction as viewed in FIGS 2–4 causes the cooperating hingedly connected upper and lower tray members 40 and 42 to move from the closed position in FIG. 2 to the partially open position shown in FIG. 3 and finally to the fully open position in FIG. 4. Counterclockwise rotation of the shaft 52 causes the cooperating tray members 40 and 42 to move from the open position shown in FIG. 4 to the partially closed position shown in FIG. 3 and ultimately to the fully closed position shown in FIG. 2.

The guide assembly 48 which assists in movement of the cooperating tray members 40 and 42 between the closed and open position shown in FIGS. 2 and 4, respectively, includes guide arm 80, the upper end of which is secured by suitable bolts 81 to the exterior surface of the lower tray 42. The lower end of the guide arm 80 is provided with transverse oppositely directed studs 82a and 82b. Rotatably mounted to the free end of the studs 82a and 82b are suitable guide wheels 83a and 83b which slidably interfit in channels 84a and 84b formed in stationary vertical guide channel members 85a and 85b. The guide wheels 83a and 83b in combination with the guide channels 84a and 84b function to constrain movement of the lower end of the guide arm 80 to a vertical reciprocatory path parallel to the guide channel and extending between an upper limit depicted in FIG. 4 occurring when the tray members 40 and 42 are in their open position and a lower limit (not shown) occurring at an intermediate point in the travel of the tray members 40 and 42 between their open and closed positions.

Counterclockwise pivotal movement of the upper tray member 40 about the axis of the shaft 52 is limited by a limit switch 86 mounted on an angulated bracket 88 secured to the lower end of a stationary wall 89 which downwardly depends from the lower surface of the housing top 10a. Switch 86 has a movable actuating arm 87 adapted to be tripped by abutment with ear 44a when the tray member 40 moves to its desired inner closed position of FIG. 2. Clockwise pivotal movement of the upper tray member 40 about the axis of the shaft 52 is limited by a limit switch 90, fixed to a stationary support member 91, which has a movable switch actuating arm 92 adapted to be tripped by the stud 82b when the tray members 40 and 42 are in their open position shown in FIG. 4. Tripping of the switch 90 when the stud 82b reaches the position shown in FIG. 4 corresponding to the fully open position of the upper and lower trays 40 and 42 is effective to deenergize the motor 58 in a conventional manner. When the motor 58 is deenergized the shaft 52 ceases rotation about its axis, holding the upper tray member 40 in the position shown in FIG. 4. With the upper tray member 40 fixed in the position shown in FIG. 4, the pin 44c of the hinge 44 is effectively stationary. With the hinge pin 44 stationary, the lower tray member 42, when the tray is in the open position shown in FIG. 4, is constrained to move only in a pivotal manner about the axis of the pin 44. However, such pivotal motion of the lower tray 42 about the axis of the pin 44 cannot occur since accompanying such pivotal motion of the lower tray 42 would be movement of the stud-mounted guide wheels 83a and 83b through an arc having its center coincident with the stationary pin 44, which arcuate motion cannot occur by virtue of the fact that the stud-mounted guide wheels 83a and 83b are constrained to move in only a vertical direction by the guide channels 84a and 84b. Thus, when the shaft 52 has rotated in a clockwise direction to position the upper and lower tray members 40 and 42 in the open position and the switch 90 has been tripped to deenergize the motor 58 and hold the shaft 52 in the angular position to which it has been driven, the upper tray member 40 is held in the position shown in FIG. 4 by the angularly locked shaft 52, while the lower tray 42 is held in the position shown in FIG. 4 by the effectively stationary pin 44c and the channels 84a and 84b which prevent pivotal movement of the lower tray 42 about the pin 44c.

To facilitate transverse displacement of the lower tray member 42 from the position inside the cabinet 10 and aligned with terminal region 12c depicted in FIG. 2 to a position outside of the cabinet transversely displaced from terminal region 12c depicted in FIG. 4, the front 10b of the cabinet 10 is provided with a rectangular opening 10b. The opening 10h is adapted to be selectively closed by a door 10c when the tray members 40 and 42 are in the closed position depicted in FIG. 2. The door 10c is in the form of a planar rectangular panel hingedly mounted to the cabinet along its lower edge by a hinge 97 which includes an ear 97a fixed to and projecting rearwardly from the inner surface of the door panel 10c, an ear 97b mounted to a stationary support bracket 97c located in the interior of the cabinet, and a pin 97d projecting perpendicularly through suitably provided bores in the ears 97a and 97b.

To facilitate opening and closing of the door 10c when the lower tray member 42 is moved between a position exteriorly of the cabinet 10 depicted in FIG. 4 and a position interior of the cabinet as depicted in FIG. 2, a tension spring 94 and a pair of identical cams 95a and 95b are provided. The tension spring 94 has one end connected to a bracket 93 mounted on the interior surface of the door 10c and its other end connected to a stationary bracket 96 mounted within the cabinet. The tension spring 94 functions to bias the door 10c in a clockwise direction about its lower hinge mounting 97, tending to close the door and seal the opening 10h.

Since cams 95a and 95b are identical, only cam 95a is described in detail. The cam 95a includes an ear 100a projecting radially from the exterior surface of the lower tray 42 and a wheel 101a mounted for rotation about a pin 102a passing perpendicularly through the free end of the ear 100a.

As indicated, the tension spring 94 biases the door panel 10c in a clockwise direction about its lower hinged edge tending to maintain the door panel 10c in its closed position coplanar with the cabinet front 10b to seal the opening 10h. However, as the lower tray member 42 moves from its closed position depicted in FIG. 2 to its fully open position exteriorly of the cabinet 10 depicted in FIG. 2 to its fully open position exteriorly of the cabinet 10 depicted in FIG. 4, the cam wheels 101a and 101b engage the inner surface of the door panel 10c. This cams the door panel outwardly from the position shown in FIG. 2 to an intermediate position shown in FIG. 3 and finally to the fully open door position shown in FIG. 4. Similarly, when the lower tray member 42 moves from a position exteriorly of the cabinet 10 depicted in FIG. 4 to a position within the cabinet depicted in FIG. 2, the cam wheels 101a and 101b recede from the positions shown in FIG. 4 to their intermediate position shown in FIG. 3 and eventually to their innermost positions shown in FIG. 2, allowing the tension spring 94 to return the door from its fully open position (FIG. 4) to its partially closed position (FIG. 3) and eventually to its fully closed position (FIG. 2).

To facilitate locking of the door panel 10c in the closed position (FIG. 2), the ears 50 are provided with an extension 110 which mounts a transversely disposed lock bar 112. The ends of the lock bar 112 engage suitably located notches 113 formed in the edge of reinforcing panels 115 projected rearwardly from and secured to the inner surface of the door panel 10c. The configuration and dimensioning of the ear extensions 110 and the notches 113 are selected such that when the upper and lower tray members 40 and 42 are in a closed position shown in FIG. 2 the ends of the transverse lock bar 112 engage the notches 113 formed in the door reinforcing panels 115. Further, ear extensions 110 and the notches 113 are dimensioned such that in the initial stages of movement of the upper and lower tray members 40 and 42 from the closed position shown in FIG. 2 to the open position shown in FIG. 4, prior to engagement of the cam wheels 101a and 101b with the door panel 10c, the stop bar 112 disengages the notches 113, enabling the door to pivot to its open position under the action of the outwardly moving cams 95a and 95b.

To facilitate maintenance of the airtight integrity of the pneumatic tube system 12 when the upper and lower tray members 40 and 42 are in the closed position shown in FIG. 2 a novel seal arrangement is provided. The seal arrangement includes identical tubular sections 104 and 105 which form part of the terminal regions 12c and the control tube 12d. Since the tubular sections 104 and 105 are of identical construction only one of the sections, namely, tubular section 104, is described. Tubular section 104 includes a radially extending flange 106. The radially extending flange 106 permits the tubular section 104 to be secured coaxially to the end of the elbow 12b by a suitable fastening means 114. A semicircular sealing section 107 extends axially from the exterior portion of the tubular section 104 to a point beyond the end of the bore 116 formed in the tubular section 104. With the sealing section 107 extending beyond the end of the bore 116, the margin 107a of the sealing section 107 overlaps the adjacent margin 40a of the upper semicircular tray member 40, facilitating sealing of the ends of the upper semicircular tray member 40 and the associated semicircular portion of the tubular section 116.

To facilitate sealing the upper semicircular portion of the tubular section 116 and the edge 40a upper semicircular tray member 40, a semicircular section of an O-ring 117 is secured to the interior surface of the marginal portion 107a of the sealing rim or section 107, and a radially extending bead 118 on the exterior marginal surface 40a of the semicircular tray member 40 is provided. The tubular section 104 further includes a lower sealing section whose arcuate length is at least coextensive with the arcuate length of the end of the lower tray member 42. The lower seal section 120 includes a frustoconical surface 121 and an O-ring 122 positioned axially inwardly of the adjacent edge of the upper tray member 40a to prevent mechanical interference between the O-ring 122 and the edge of the upper tray member 40 as the tray member 40 moves between its open and closed positions. The frustoconical surface 121 cooperates with a similarly angled surface 123 formed on the end of the lower tray member 42 to establish an overlapping region which is sealed by the O-ring 122.

To seal the mating longitudinal edges 124, 125 and 126, 127 of the lower and upper tray members 42 and 40, respectively, strips of resilient sealing material 128 and 129 are interposed between the cooperating edge surfaces, preferably secured to the surfaces 125 and 127 of the upper tray member 40.

In operation, when the upper and lower tray members 40 and 42 are moved from their outer position shown in FIG. 4 to their inner position shown in FIG. 2, the marginal regions 40a of the upper tray 40 which underlie marginal regions 107a of the sealing rim 107 move toward the marginal 107a causing the semicircular bead 118 to engage the inner surface of the O-ring 117 compressing the O-ring and effecting a seal between the marginal region 40a of the upper semicircular tray member 40 and the upper semicircular portion of the tubular sections 104. Additionally, as the upper and lower trays 40 and 42 move to the position shown in FIG. 2, the end surface 123 of the lower tray member 42 which underlies the frustoconical surface 121 of the tubular section 104 moves toward the latter surface 121 compressing the O-ring 122 and thereby sealing the end of the lower semicircular tray 42 and the lower semicircular portion of the tubular section 110. Cooperating surfaces 121 and 123 and interposed O-ring 122, and margins 40a and 107a and interposed O-ring 117, collectively function to seal the entire end of the tubular tray 40, 42 and the tubular section 104. The right-hand end of the tubular tray 40, 42 and the tubular control section 105 are sealed in the same manner as the left hand of the tubular tray 40, 42 and the tubular section 104. The sealing of the tubular tray 40, 42 when the tray is in the closed position depicted in FIG. 2 is completed when the mating edges 124, 125 and 126, 127 of the tray members 40, 42 move together to the position shown in FIG. 6 wherein the resilient sealing strips 128 and 129 are compressed by the cooperating longitudinal edges of the trays.

A suitable circuit for controlling the operation of the motor 58 is depicted in FIG. 9. The motor 58 preferably is bidirectional having two windings 58a and 58b which, when alternatively energized, drive the motor shaft 62 in opposite directions. The motor control circuit includes a source of potential 130 having one terminal connected to a common line 131 of the motor and the other terminal connected to a common line 132. Connected in series between the winding 58a and the common line 132 is a normally open pushbutton switch 133, and the normally closed limit switch 86 which opens when the tray 40, 42 is in the closed position shown in FIG. 2. In operation, and assuming that the tray 40, 42 is not in the position shown in FIG. 2, the tray can be placed in the position shown in FIG. 2 by closing the switch 133. Closure of the switch 133 energizes the winding 58a, causing the motor to rotate the shaft 52 in a counterclockwise direction as viewed in FIG. 2. When the tray 40, 42 reaches the position shown in FIG. 2, the movable arm 87 of the switch 86 is actuated by abutment with the hinge ear 44a, open circuiting the winding 58a.

A manually operative normally open switch 134, and the normally closed switch 90 are interconnected between the winding 58b and the common line 132. Assuming the tray 40, 42 is not in the open position shown in FIG. 4, the tray can be placed in the open position by actuating the switch 134. Actuation of switch 134 completes an energization circuit to the winding 58b causing the motor to rotate the shaft 52 in the clockwise direction. Clockwise rotation continues until the switch 90 is tripped by abutment with the stud 82 upon the tray reaching the open position shown in FIG. 4 whereupon the normally closed switch 90 opens, interrupting the energization circuit to the winding 58b. Interruption of this energization circuit terminates shaft rotation in a clockwise direction and hence further opening motion of the tray.

To prevent a carrier 14 positioned in the lower tray member 42 when in the open position shown in FIG. 4 from sliding axially and falling out of the tray, as well as to prevent a customer returning a carrier to the lower tray from mispositioning it in the tray such that the carrier ends protrude beyond the tray ends and thereby prevent proper return of the trays to their closed position, a pair of fins 140 and 141 are provided. The fins 140 and 141 are identical in construction and each include an upstanding ear 143 which is freely pivotally mounted about the hinge pin 44c. In operation, as the tray 40, 42 moves from the closed position (FIG. 2) to the open position (FIG. 4) 4) the fins 140 and 141 move outwardly and upwardly relative to the lower tray 42 to the position shown in FIG. 4. Pins 144 fixed to the fins abut adjacent ends of the lower tray section to preclude the possibility of their being lowered and hence removed from their end blocking position. Similarly, as the tray 42 moves from the outer position shown in FIG. 4 to the inner position shown in FIG. 2, the fins 140 and 141 move inwardly and downwardly relative to the lower tray section 42 as the lower tray section moves to its final inner position shown in FIG. 2. In this position the upper edges of the fins 140, 141 are clear of the ends of the cooperating tray members 40, 42 permitting the ends of the tray members to properly seal with their associated tubular sections 110 and 112.

Having described the invention, what is claimed is:

1. In a conveyor system having a carrier-conveying tube provided with a terminal region through which a carrier passes when conveyed between a point within said tube remote from said terminal region and a point without said tube adjacent said terminal region, the improvement comprising:
 first and second substantially semicylindrical members axially displaced from said tube terminal region with their axes parallel to the tube terminal region axis,
 means mounting at least one of said semicylindrical members for movement between a closed position wherein said members cooperate to form a tubular extension of said tubular terminal region for containing a carrier without said tube and axially displaced from said terminal region, and an open position wherein said members are at least partially separated with said first member transversely displaced from said tubular terminal region with the axis of said first member substantially parallel to said tube terminal region axis when so displaced for containing a carrier without said tube in a position displaced transversely of, but substantially parallel to, said terminal region axis.

2. In a conveyor system having a carrier-conveying tube provided with a terminal region through which a carrier passes when conveyed between a point within said tube remote from said terminal region and a point without said tube adjacent said terminal region, the improvement comprising:
 first and second substantially semicylindrical members axially displaced from said tube terminal region with their axes parallel to the tube terminal region axis, said semicylindrical members each having a pair of opposed longitudinal edges, means mounting at least one of said semicylindrical members for movement between a closed position wherein said members cooperate to form a tubular extension of said tubular terminal region for containing a carrier without said tube and axially displaced from said terminal region, and an open position wherein said members are at least partially separated with said first member transversely displaced from said tubular terminal region for containing a carrier without said tube and transversely displaced from said terminal region, said mounting means including a. hinge means interconnecting each of said semicylindrical members along one of their respective longitudinal edges, and b. means for pivoting said second semicylindrical member along the other longitudinal edge thereof between first and second positions wherein said semicylindrical members are positioned in said closed and open positions, respectively.

3. The improvement of claim 2, wherein the axes of said semicylindrical members are horizontal and wherein said mounting means further includes guide means for maintaining said first semicylindrical member in a generally concave upward disposition as said first member moves between said open and closed positions.

4. The improvement of claim 3 further including a. a housing enclosing said terminal region and semicylindrical members, said housing having a door mounted for movement between an open position providing access to said first semicylindrical member when said members are open and a closed position preventing access to said first member, and b. a cam member mounted for movement with said first member for opening said door when said second semicylindrical member pivots to said second position to place said members in said open position.

5. The improvement of claim 4 further including a lock element mounted for movement with said second member for unlocking said door as said second member pivots to said second position, thereby enabling said cam member to open said door when said semicylindrical members move to their open positions.

6. The improvement of claim 3 further including abutment plates pivotally mounted about a horizontal axis for movement between abutting and nonabutting positions adjacent opposite ends of said first semicylindrical member when the latter is in its open and closed positions, respectively.

7. In a conveyor system having a carrier-conveying tube provided with a terminal region through which a carrier can pass, the improvement comprising:

first and second spaced apart coaxial tubular sections each having a. an exterior semicircular sealing section extending in an axial direction beyond one end of said section toward the other section and located at a radius greater than the radius of the exterior surface of a carrier, and b. an interior semicircular sealing section located intermediate the ends of said tubular section adjacent said one end, said interior and exterior sealing sections of each tubular section being located relative to each other to collectively comprise a substantially circular seal, first and second substantially semicylindrical members disposed between said tubular sections, means mounting at least one of said semicylindrical members for movement between a closed position wherein sad members cooperate to carry a tube with the opposite ends of said members in sealed relation with said interior and exterior sealing sections of said tubular sections, and an open position wherein said members are at least partially separated with at least one of said members transversely displaced relative to the axes of said tubular sections.

8. The improvement of claim 7 wherein each of said exterior sealing sections includes a flange formed integral with said one end of its respective tubular section, and wherein said interior sealing section includes a frustoconical surface formed on said one end of its respective tubular section.

9. A conveyor system comprising a carrier conveying tube having a terminal region through which a carrier passes when conveyed between points within and without said tube, tubular means dimensioned and configured to contain a carrier therein, at least a section of said tubular means being movable, and positioning means mounting said section for positioning said section between a closed position wherein said tubular means is positioned along a first axis and forms a tubular extension of said terminal region for containing a carrier without said tube, and an open position wherein said movable section is displaced from said terminal region to a position displaced transversely of, but substantially parallel to, said first axis for supporting a carrier without said tube in a position displaced transversely of, but substantially parallel to, said first axis.